United States Patent [19]

Stillman

[11] 4,152,476
[45] May 1, 1979

[54] LAMINATE BEARING A MAGNETIC TAPE

[75] Inventor: Nathan Stillman, Walnut Creek, Calif.

[73] Assignee: Champion International Corporation, Stamford, Conn.

[21] Appl. No.: 774,441

[22] Filed: Mar. 4, 1977

[51] Int. Cl.² .......................... B32B 7/06; G11B 25/04
[52] U.S. Cl. ..................... 428/189; 156/230; 156/249; 360/2; 428/200; 428/202; 428/205; 428/213; 428/349; 428/353; 428/354; 428/900; 428/913; 428/915; 235/449; 235/493
[58] Field of Search ............... 428/900, 915, 916, 189, 428/539, 913, 200, 349, 201, 353, 202, 354, 203, 204, 205, 213; 427/129, 299, 301, 302; 156/272, 230; 360/2; 235/61.11 D, 61.12 M

[56] References Cited
U.S. PATENT DOCUMENTS

| | | | |
|---|---|---|---|
| 3,412,483 | 11/1968 | Jacobs | 360/2 |
| 3,840,427 | 10/1974 | Brazier | 156/272 |
| 3,975,574 | 8/1976 | Saluke | 428/900 |
| 4,090,003 | 5/1978 | Pierson | 360/2 |
| 4,090,662 | 5/1978 | Fayling | 360/2 |

Primary Examiner—Stanley S. Silverman
Attorney, Agent, or Firm—Evelyn M. Sommer

[57] ABSTRACT

A laminate blank suitable for use in making a credit or identification card is disclosed. It consists essentially of, in order, a surface carrier film, a magnetic coating and a card substrate. The surface carrier and magnetic coating comprise a unitary transfer tape. The card substrate is bonded to the magnetic coating by means of a strong adhesive. In contrast, the carrier film and magnetic coating of the tape are relatively very weakly united. This construction facilitates application of the requisite magnetic coating to the surface of the eventual card, and permits ready access to such coating through simple mechanical removal of the tape carrier film of the blank.

7 Claims, 2 Drawing Figures

U.S. Patent  May 1, 1979  4,152,476
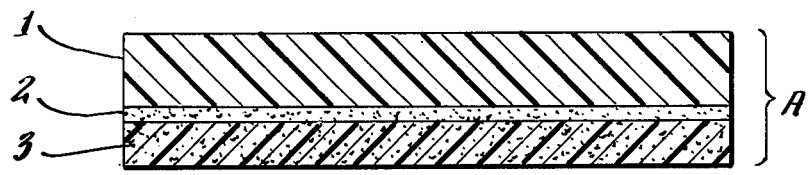
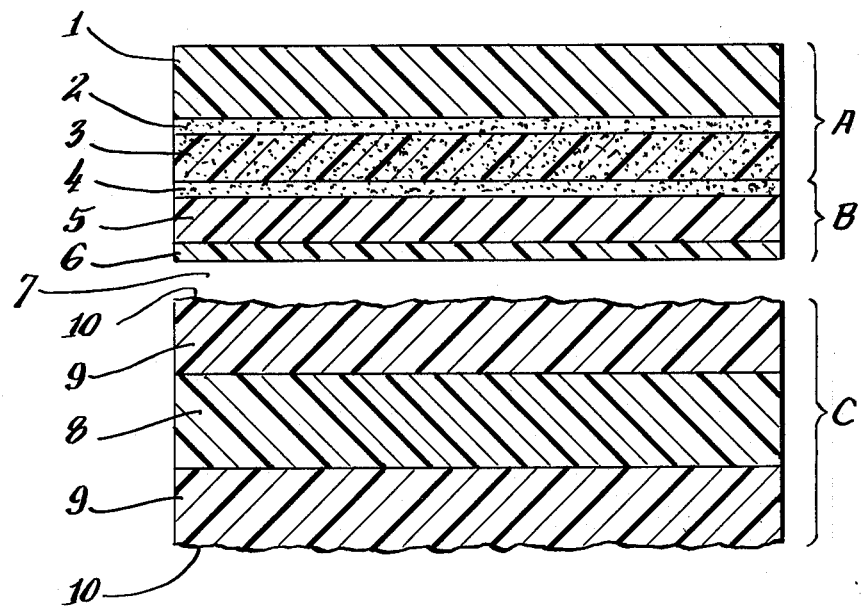

LAMINATE BEARING A MAGNETIC TAPE

DETAILED DESCRIPTION OF THE INVENTION

This invention relates to a laminate blank bearing a protected magnetic coating. This blank has improved resistance to marring and may be produced most easily. The principal object of this invention is to provide a laminate blank bearing an exposable magnetic coating for data display cards such as those used for credit or identification.

The laminate blank contains a surface carrier film weakly united with the magnetic coating. These two plies compose a sublaminate, referred to herein as a "magnetic tape", which may be affixed to a supporting card substrate.

The carrier film is utilized to facilitate applying the magnetic coating to the card substrate and to protect that coating until, after production of the laminate blank, it is stripped off to expose the magnetic coating. In brief, therefore, this invention relates to producing cards receptive of data display by transferring a magnetic coating from a temporary laminate to a permanent one. Other objects, aspects and advantages of this invention will be apparent from the following specification, drawing and the appended claims.

The magnetic tapes of this invention ordinarily employ a polymeric web or sheet as the carrier film. The film may have the dimensions of a typical credit card, e.g. about 5.5 centimeters by 8 centimeters. To as least a portion of the film is bonded the magnetic coating. Generally, the magnetic coating will be in the form of a stripe approximately ½ to 2 centimeters in width across the surface of the film in either a horizontal or vertical direction. The magnetic tapes of this invention however, are not limited to these configurations. For example, this invention also contemplates constructions in which the magnetic tapes or coating completely covers, or is of varying and/or multiple shapes over, the surface of the eventual card blank.

Any polymer which forms a strong, preferably flexible, web or sheet may be used as the carrier film of the magnetic tape. Ordinarily, however, a polyester is employed.

The term "polyester", as used herein, includes those resins containing condensates of polyhydric alcohols—e.g. $C_2$ to $C_{10}$ saturated or unsaturated polyhydroxy organic alcohols—with polybasic organic acids, preferably ones having from 2 to 16 carbon atoms. Examples of these polyester condensates are: poly(ethylene succinate); poly(ethylene sebacate); poly(propylene fumarate); poly(ethylene terephthalate) and the like.

Magnetic tapes such as those contemplated for use in this invention are of a type known in the art. Such magnetic tapes are generally made by dispersing an electrically conductive powder throughout a neutral binder to form a mixture which may be coated onto a pliable carrier film. The preferred powder is one composed of magnetic iron oxide. The binder materials include, for example, vinyl chloride-vinyl acetate copolymers, silicon resins, polyamide resins, phenol resins, butadiene-acrylonitrile copolymers, nitrocellulose, polyurethane resins, epoxy resins, melamine resins, vinylidene chloride-acrylonitrile copolymers, polyacrylic acid resins, methacrylic acid resins, and others. The ratio of electrically conductive powder to binder material ordinarily ranges from about 10:1 to about 1:2 by weight.

The magnetic coating and carrier film of the tape are only weakly bonded together. More specifically, the bond should be substantially weaker than any other in the card blank. It is this relative weakness in the sublaminate tape which permits eventual exposure of the magnetic coating on the card substrate.

The bond between the magnetic coating and the carrier film may be a direct one formed by virtue of the adhesive character of the binder in the coating, the composition of the film, or both. Alternatively, a weak adhesive or primer substance may be utilized for this purpose. Any primer or adhesive used should also be capable of pulling completely away from the surface of the magnetic coating, thus leaving such surface clean, dry and non-tacky. Suitable substances for use in this manner naturally depend upon the particular given compositions of the film and coating. Such substances are, however, known in the art and appropriate selections are therefore readily made.

The entire thickness of the magnetic tape of this invention will be maximally in the range of from about 2 to about 7 mils. Preferably, it is about 5 mils.

The card substrate to which the magnetic tape is attached in accordance with this invention comprises a receptor layer, to which the magnetic coating side of the tape is bonded. The card substrate may be of unitary construction and serve as the chief structure imparting or supporting constituent of the laminate. Preferably, however, it comprises a thin, flexible receptor layer—such as a web, film or sheet—affixed to a further supportive card base layer. In either embodiment, the preferred composition of this receptor layer is polyester or polyethylene.

The magnetic tape is bonded tightly to the receptor layer, preferably by means of an adhesive material which bonds strongly to that layer and the magnetic coating. Suitable adhesives for this purpose include aliphatic thermoplastic polyester-based urethane coating resins and thermoplastic linear polyesters. The bonding may be accomplished by heat and pressure in conventional manner, for example, employing temperatures ranging from about 135° to about 150° C. and pressures about 40 lbs/in.

A card base layer may be present in the card substrate as the chief structure imparting or supporting constituent of the blank. It preferably comprises a sheet of polyvinyl chloride, polyester or a copolymer of vinyl chloride and vinyl acetate. The card base also desirably includes a polyethylene coating on both surfaces of this sheet. Additionally, the polyethylene coated surface which will be bonded to the receptor layer, or both surfaces, can be subjected to corona treatment employing conventional corona treatment techniques. This improves its ability to form strong bonds. The thickness of the respective polyethylene coatings usually range from about 1 to about 2 mils and are preferably about 1.5 mils.

On the inner surface of the receptor base layer adjacent the card base layer there may be applied a polymeric primer. Exemplary of such a primer is polyethylene imine. This optional primer promotes adhesion between the card base and receptor layer.

This invention will be better understood by reference to the associated drawings, wherein:

FIG. 1 is a cross-sectional view of the laminate blank of this invention; and

FIG. 2 is a cross-sectional view of a preferred card laminate blank of this invention.

Referring now to FIG. 1, a magnetic coating 3 is shown bonded to a polymeric carrier film 1 by means of an optional adhesive or primer substance 2. The bond between the substance 2 and polymeric carrier film 1 is much stronger then the bond between substance 2 and magnetic coating 3.

Referring now to FIG. 2, sublaminate A represents a magnetic tape comprising a carrier film 1 bonded to the magnetic coating 3 through an optional adhesive or primer substance 2. Substance 2 need be applied only to the surface of the magnetic coating 3 and/or to the coating-contiguous area of carrier film 1. The substance 2 is preferably of cohesive film-like composition and adheres tightly to the carrier 1, but relatively weakly to the coating 3.

Sublaminate A is bonded with receptor layer B by means of an adhesive 4, which is preferably heat activatable. Adhesive 4, which is also preferably applied only to the surface of the magnetic coating 3 or to the coating-contiguous area of flexible web 5, strongly adheres to both of these surfaces. On the other surface of flexible web 5 there is applied a layer of primer 6 such as, for example, polyethylene imine to improve lamination.

The card base C bonded to the receptor layer B through the primer 6 comprises a structure imparting sheet 8 of, for example, polyvinyl chloride, polyester or vinyl chloride/vinyl acetate copolymer and is shown coated on either side with an optional polyethylene film 9, the surfaces 10 of which have each been corona treated.

In FIG. 2, a space 7 is shown. A photograph or other identification indicia, e.g. fingerprints, etc. (not shown) may optionally be inserted there. upon insertion of the optical identification indicia between the primed receptor base B and the card base C, the credit card laminate can be readily formed by conventional heat sealing techniques. Commonly, this identification indice is shorter in its dimensions than the card itself. This permits the perimeters of the receptor layer B and card base C to adhere and seal the indicia internally in space 7. In addition, they may bond to the surfaces of the inserted identification indicia.

In the preferred embodiment in which an appropriate indicia is inserted at space 7, the receptor layer A is desirably composed of optically transmissive material(s). In this manner, the visibility of this further identification is insured.

In the credit card laminate of FIG. 2, the uppermost layer, surface film 1, is bonded only weakly to the magnetic coating 3. That film is therefore easily torn away, exposing a credit or identification card, the new upper surface of which includes magnetic coating 3. Coating 3 may then be sensitized in known manner to carry data indicia.

Manufacture of the blanks of this invention may be performed by means evident from the foregoing description. Thus, the magnetic tape A may be tightly affixed to a card substrate composed of either the receptor layer B, alone, or of a sublaminate or both the receptor layer B and card base C. This mode of manufacture—which depends upon the exposability of the blank's internal magnetic coating—facilitates handling and application of the delicate coating to the eventual card.

What is claimed is:

1. A laminate blank for data display cards comprising: a surface carrier film; a magnetic coating bonded to at least a portion of said film; and a supporting card substrate bonded to said coating, said card substrate comprising a card base and a sublaminate receptor layer comprising a planar flexible polyester web coated on one surface with a polyethylene imine primer and having an adhesive layer on the other surface bonded to the magnetic coating, wherein the bond between said surface carrier film and the magnetic coating is the weakest point of lamination of the blank.

2. The laminate of claim 1, wherein the carrier film, magnetic coating and receptor layer have a total thickness of about 7 mils.

3. The laminate of claim 1, wherein the receptor layer comprises a planar flexible polymeric web coated on one surface with a heat activated adhesive and is bonded through said adhesive to the magnetic coating.

4. The laminate of claim 3, wherein the magnetic coating has surface dimensions smaller than those of the surface carrier film.

5. The laminate of claim 4, wherein the heat activated adhesive bonding the magnetic coating and receptor layer is contiguous in a surface area with said coating.

6. A laminate blank for data display cards comprising: a surface carrier film; a magnetic coating bonded to at least a portion of said film; and a supporting card substrate bonded to said coating, said card substrate comprising a card base including (1) a planar sheet of polyvinyl chloride, polyester or a copolymer of vinyl chloride and vinyl acetate, said sheet being coated on both sides with polyethylene film which has been subjected to surface corona treatment, and (2) a receptor layer comprising a planar flexible polyester web coated on one surface with a polyethylene film and coated on the other surface with an adhesive layer, said adhesive layer being bonded to the magnetic coating.

7. The laminate of claim 6, wherein identification indicia are interposed between said card base layer and said receptor layer and said receptor layer is optically transmissive.

* * * * *